United States Patent [19]

Carruth

[11] Patent Number: 4,904,443
[45] Date of Patent: Feb. 27, 1990

[54] CONTROL ROD DRIVE WITH UPWARD REMOVABLE DRIVE INTERNALS

[75] Inventor: John C. Carruth, San Jose, Calif.
[73] Assignee: General Electric Company, San Jose, Calif.
[21] Appl. No.: 202,864
[22] Filed: Jun. 2, 1988
[51] Int. Cl.[4] ............... G21C 7/00; G21C 19/00
[52] U.S. Cl. .................. 376/233; 376/260; 376/353; 376/362
[58] Field of Search ............ 376/233, 260, 230, 353, 376/352, 362, 232

[56] References Cited

U.S. PATENT DOCUMENTS

| | | | |
|---|---|---|---|
| 3,650,895 | 3/1972 | Sodergard | 376/353 |
| 4,158,600 | 6/1979 | Akimoto et al. | 376/233 |

FOREIGN PATENT DOCUMENTS

| | | | |
|---|---|---|---|
| 0006892 | 1/1977 | Japan | 376/353 |
| 0070994 | 4/1984 | Japan | 376/353 |
| 0071986 | 4/1985 | Japan | 376/362 |

Primary Examiner—Harvey E. Dehrend
Attorney, Agent, or Firm—Robert R. Schroeder

[57] ABSTRACT

The control rod drive is removed from the top of the reactor. The control rod drive is attached at its upper end to the bottom end of the control rod drive guide tube. The control rod guide tube in turn couples at a rotationally locked bayonet fitting to the top of the control rod drive housing. Locking of the bayonet fitting occurs thru the orificed fuel support casting. The orificed fuel support casting, is locked from rotation at a pin located on the reactor core plate. The control rod guide tube in turn locks rotationally to the orificed fuel support casting. During refueling, the fuel bundles and the orificed fuel support casting are removed, freeing the control rod guide tube and its depending drive for rotation. Thereafter, a fitting captures the control rod guide tubes at coolant inflow apertures and rotates the guide tubes and the depending drives. Uncoupling of the control rod guide tube occurs at a bayonet fitting between the top of the control rod drive housing and the bottom of the control rod guide tube. Thereafter, upward removal of the control rod guide tube and, of necessity, the depending attached control rod drive occurs. Replacement of the drive occurs with the disclosed sequence reversed.

6 Claims, 5 Drawing Sheets

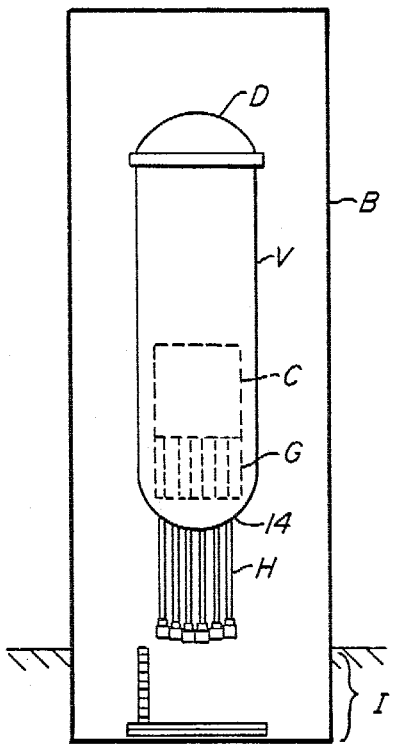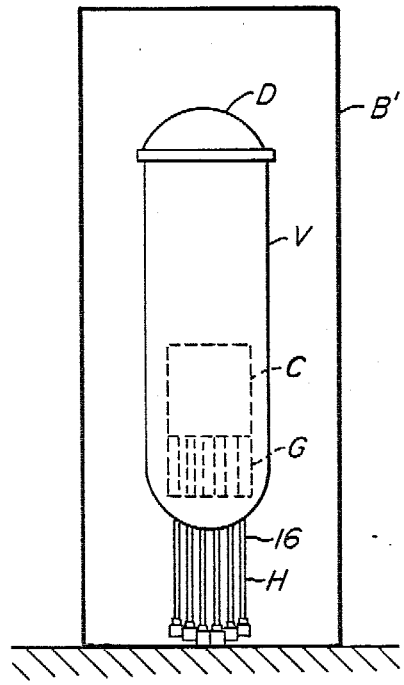
FIG._1A.
PRIOR ART
FIG._1B.
PRIOR ART

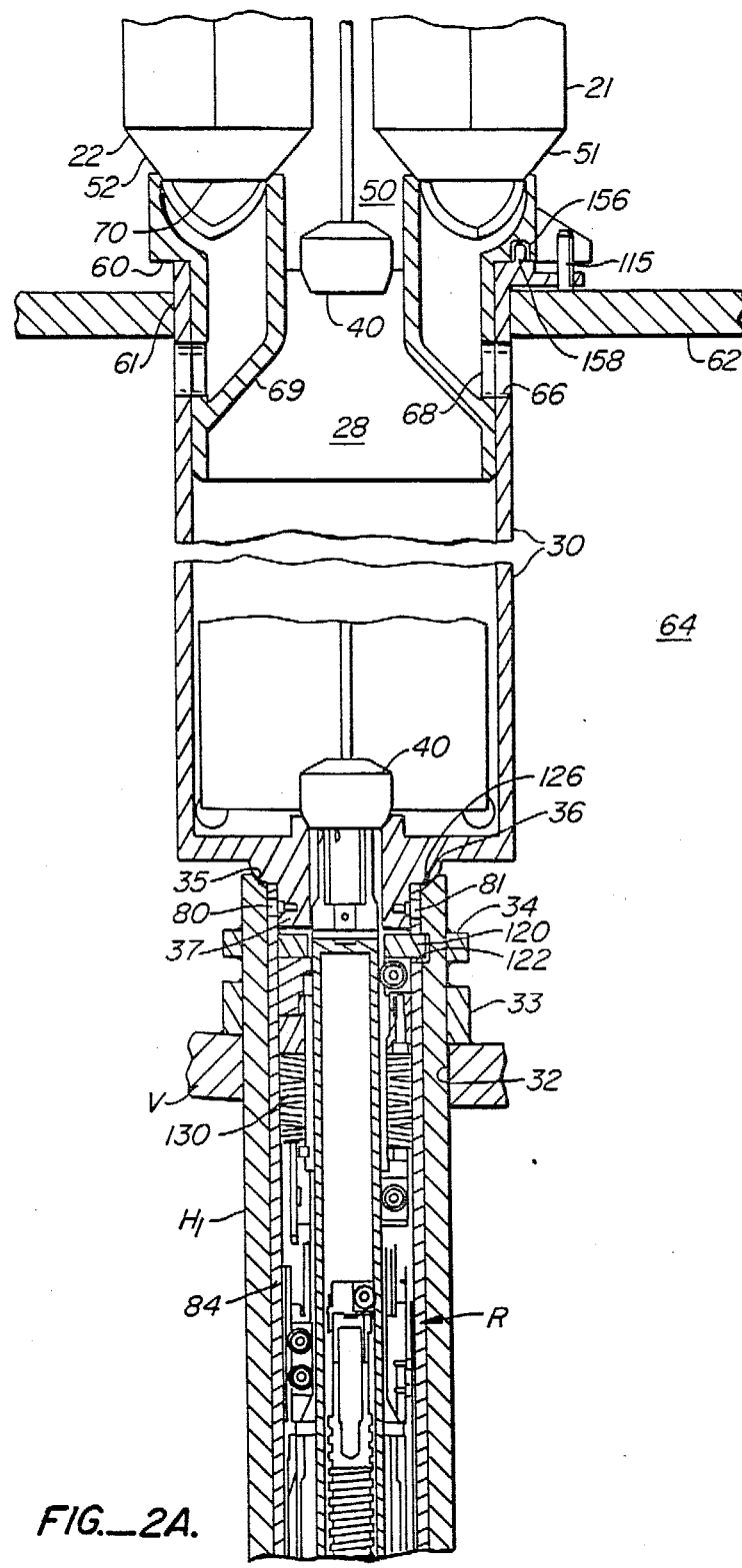
FIG._2A.

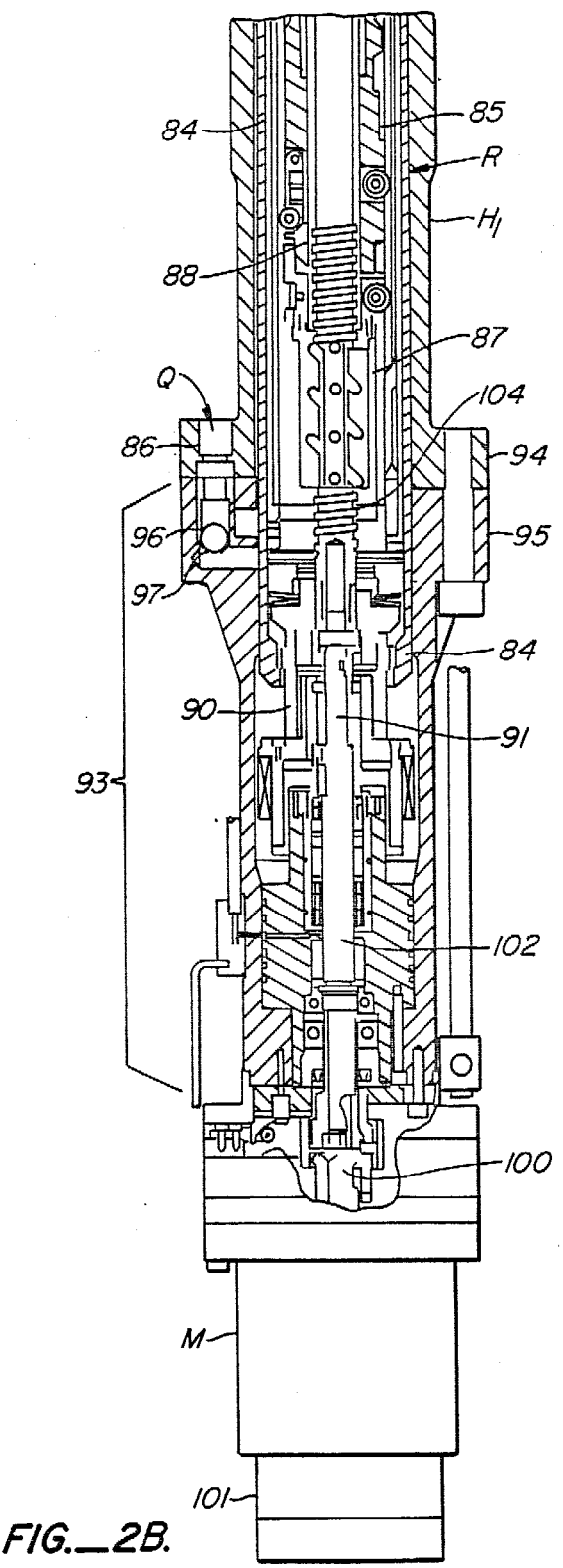
FIG._2B.

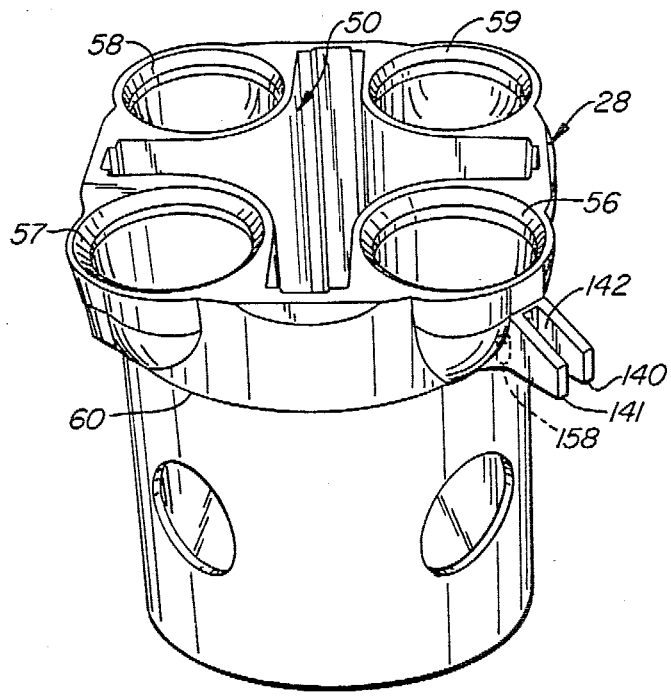
FIG._3.
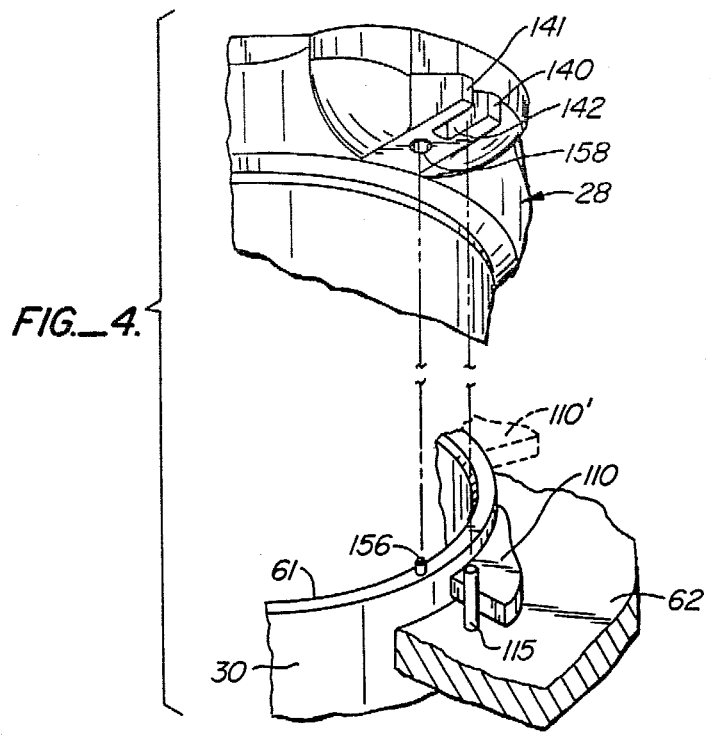
FIG._4.

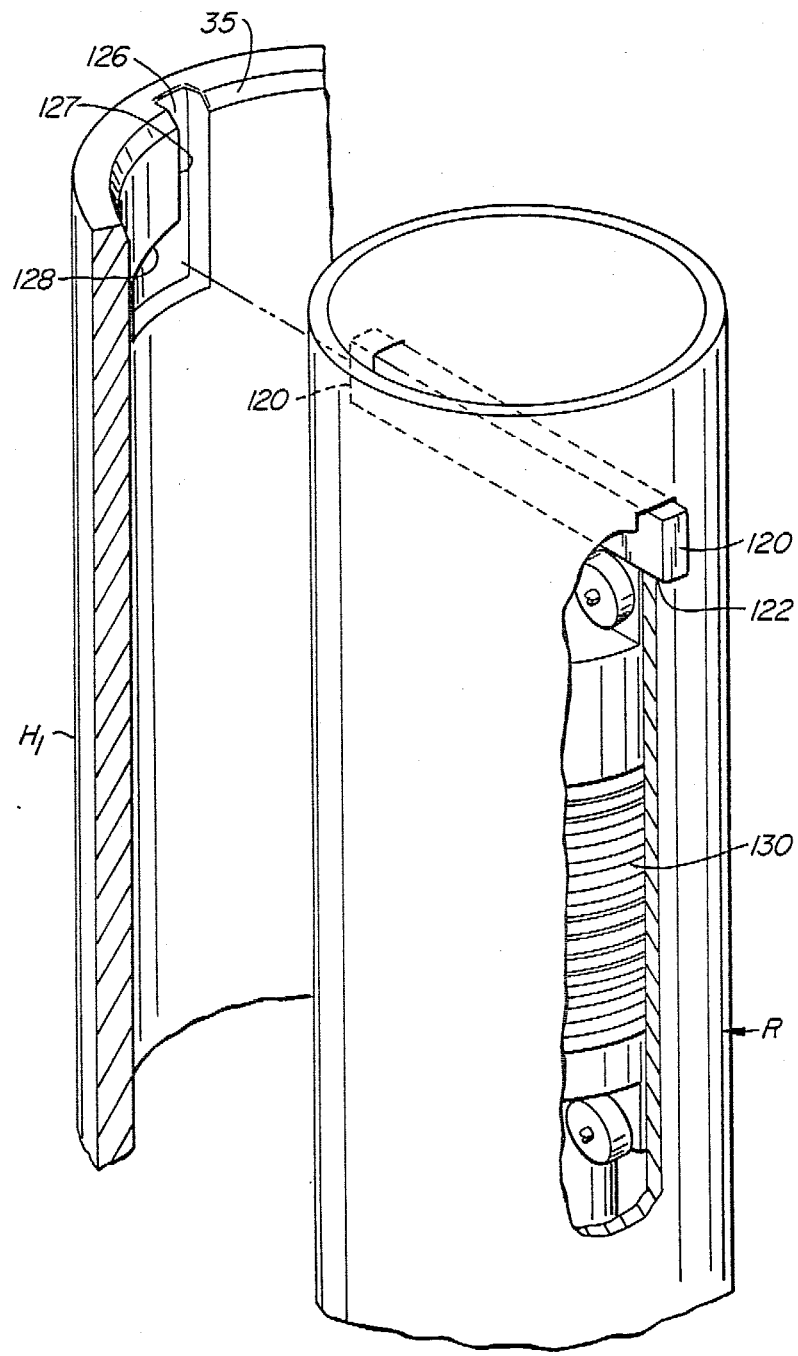
FIG._5.

CONTROL ROD DRIVE WITH UPWARD REMOVABLE DRIVE INTERNALS

BACKGROUND OF THE INVENTION

This invention relates to nuclear reactor control rod drives. Specifically, a control rod drive suspension is illustrated which permits control rod drive removal from the top of the reactor rather than the bottom of the reactor.

SUMMARY OF THE PRIOR ART

The following specification relates to an apparatus for the suspension and removal of control rod drives from the top of a boiling water reactor. To understand the feasibility of this apparatus, it is required to set forth the support of the fuel bundles in the reactor core, summarize the flow path of coolant required for both reaction control and steam generation, and finally to understand the function of the control rods and their related control rod drives.

Support of the individual control rods in a boiling water reactor occurs from the bottom of the reactor vessel. A hole in the bottom of the vessel has a control rod drive housing supported from the periphery of the hole. The control rod drive housing protrudes a short distance into the interior of the reactor.

A structural member known as the control rod guide tube sits on top of the control rod drive housing. This control rod guide tube supported on the control rod drive housing at the bottom, penetrates a reactor core plate at the top. This control rod guide tube supports the weight of the fuel bundles immediately overlying the control rod guide tube.

Typically, each control rod guide tube supports four square section fuel bundles. A structural member in between the top of the guide tube and the bottom of the four supported fuel bundles known as the orificed fuel support casting forms the load path for the support of the fuel bundles At the bottom, the orificed fuel support casting is round and mates with the correspondingly round top of the control rod guide tube. At the top, the orificed fuel support casting defines four round outlets. Each outlet receives the bottom of a discrete fuel bundle at a fluid inlet known as the lower tie plate.

The orificed fuel support casting when turned upside down has a resemblance—strained at best—to the foot of an elephant. For this reason it is commonly referred to as an "elephant's foot".

Thus, the load path for the support of the four square sectioned fuel bundles overlying a control rod can be easily traced. The fuel bundles are supported on the orificed fuel support casting. The orificed fuel support casting in turn is supported on top of the guide tube. Finally the guide tube is supported on top of the control rod drive housing. The control rod drive housing is supported from an aperture in the bottom of the reactor vessel.

The inflow of coolant to the fuel bundles can likewise be summarized.

In the reactor vessel, extending across and below the reactor core, is a fluid barrier known as the core plate Inside the reactor vessel and below the core plate there is a water inlet plenum. Feedwater for both control of the reaction and generation of steam is introduced into this plenum.

Inside the reactor and above the core plate there is the core of the reactor. Water flows from below the core plate through holes in the core plate to the fuel bundles and to the so-called core bypass volume. For the purposes of the present invention, it is only necessary to summarize the flow to the fuel bundles.

The orificed fuel support casting consists of four ducts (one for each supported fuel bundle) which are aligned with holes in the top of the guide tube. Water flows from the inlet plenum beneath the core plate through the ducts in the orificed fuel support to the fuel bundles overlying the core plate.

Boiling water reactors typically have control rods for insertion to and withdrawal from the core of the reactor. These control rods absorb neutrons and thus control the reaction of the fissionable materials within the reactor core.

Control rods are cross shaped or cruciform shaped. These control rods fit into and out of the cross shaped or cruciform shaped interstitial area defined in the core bypass region between the individual bundles.

When control rods are withdrawn from a reactor, they reside in the control rod guide tube. Naturally, in such withdrawal, the control rods must pass through the orificed fuel support casting.

Consequently, the orificed fuel support casting is provided with a cross shaped or cruciform shaped aperture for passage of the control rod. The aperture extends from the guide tube at the bottom to the cross shaped or cruciform shaped interstitial area between the fuel bundles immediately overlying the orificed fuel supporting casting.

In boiling water nuclear reactors, these control rods are driven from the underside of the reactor vessel. So-called control rod drives drive the control rods to and from positions of penetration to the reactor core. When full penetration of all control rods occurs, the reactor is typically shutdown. When full withdrawal of a control rod occurs, the control rod resides in a structural member of the reactor below the core known as the control rod guide tube. During such full withdrawal of the control rod from the core, the reactor is usually either in operation or being refueled.

In boiling water reactors, control rod drives are contained in housings which depend a considerable length from the bottom of the reactor vessel. These depending housings are at least equal to the control rod drive in length. They attach at the very bottom of the reactor vessel.

Control rod drives have two discrete mechanical mechanisms for causing the insertion of control rods.

First, control rod drives normally responds to their own individual control rod drive motor. The motor is mounted at the bottom of the control rod drive housing. It drives a rotating shaft in the control rod drive through a gland seal, sometimes referred to as the "spool piece". Turning of the threaded shaft in the control rod drive in turn causes vertical movement of a ball screw following the threads on the shaft. The ball screw threaded to the shaft is mechanically connected to the control rod. Consequently, turning of the shaft by the motor in a first direction causes the ball screw to rise and the control rod to be inserted. Turning of the shaft in a second and opposite direction by the motor causes the ball screw to fall and the control rod to be withdrawn.

Second, control rod drives are provided with a rapid insertion feature for emergency shut down of the plant. Accordingly, the control rod drive includes a supplemental and independent hydraulic mechanism. Where immediate shutdown of a nuclear plant is required, a hydraulic fluid is introduced to a piston in the control rod drive supported on the ball screw. The control rod, under the actuation of the piston. leaves its position of support on top of the ball screw and is rapidly inserted under force of the hydraulics applied to the piston. Typically, such high pressure hydraulics are used for rapid control rod insertion—most often as part of an immediate plant shutdown known as a SCRAM. A latch mechanism maintains the control rod in the inserted position until the ball screw and motor can effect first latch withdrawal and thereafter control rod withdrawal.

It is required that control rod drives be periodically inspected and sometimes replaced. In the prior art, such inspection has occurred during refueling when the nuclear fuel from the reactor core is removed from the reactor. Typically the control rod is lowered into the interior of the guide tube so that the control rod at the bottom plugs an aperture in the control rod guide tube to prevent the flow of water from the reactor vessel into the control rod drive housing.

Once the control rod is withdrawn from the reactor and supported within the control rod guide tube, the bottom of the control rod drive housing is opened. The control rod drive—typically as long as the control rod itself—is lowered out of the open control rod drive housing.

Unfortunately, control rod drives are long. These drives, at least as long as the control rods themselves, are on the order of 14 feet in length. In order to permit lowering of the control rods from the control rod drive housings and removal of the drives from the control rod housings there must be a sufficient vertical interstitial interval between the bottom of the containment building and the bottom of the control rod housings to permit control rod drive removal. This required vertical interstitial interval is in the order of 14 feet.

Taller reactor buildings cost more. For this reason, it has been suggested in the prior art that removal of the control rod drives from the top of the reactor would enable an incrementally shorter containment building—and incrementally less expensive reactor building.

Heretofore, control rod drive removal has been suggested to include removal of the drive directly from the control rod drive housing. No specific solution to the problem of the directremoval of the control rod drive has been provided.

Such removal of control rod drives would constitute a remote process. The control rod drive is one of the deepest components within a boiling water nuclear reactor. For example, the top of a typical control rod drive is in the order of 100 feet below the surface of the required flooding coolant in the reactor during a typical reactor refueling operation.

The prior art is also complicated by the method in which the control rod drive is maintained within the control rod drive housing.

Presently, in control rod drives there is provided a guide cap assembly at the top of the drive. This guide cap assembly has a bayonet fitting with the bottom of the control rod guide tube. In short, the control rod guide cap assembly through its bayonet fitting rigidly couples the top of the control rod drive to the bottom of the guide tube.

The control rod drive is also bolted at a flange to the bottom of the control rod drive housing.

Thus, the control rod drive as a unit is firmly held between two fixed parts of the reactor. These parts are the bayonet fitting at the guide cap and the bolting of the drive to the control rod drive housing at the bottom.

Between these two fixed points of attachment to the reactor, the control rod drive must accommodate thermal expansion. Thermal expansion is accommodated at a pin affixed to the control rod drive guide cap. This pin extends through a vertical slot in the control rod pressure tube. The control rod pressure tube functions as a hydraulic component of the control rod drive and cooperates in combination with the piston to effect hydraulic control rod insertion, such as that required during SCRAM.

During such thermal excursion, the pressure tube of the control rod drive acts against Belleville springs. At the same time, the pin acts as a redundant support of the control rod drive. If the control rod drive housing should fail, the pin is present to prevent hypothetical loss of the drive.

Additionally, and at the very bottom of present control rod drives, there is a so-called middle flange. This middle flange forms the bottom of the control rod drive. It also is the point of introduction of the high pressure driving fluid for the piston actuated SCRAM of the reactor. This middle flange supports at the bottom the motor gland seal (spool piece) and control rod drive motor.

STATEMENT OF THE PROBLEM

In this environment, it has been sought to simplify attachment of the control rod drive. At the same time, the simplification of the control rod drive attachment has been sought to be integrated to a reactor assembly sequence and disassembly sequence that can accommodate and not interfere with the refueling process.

The loss of revenue to a utility during the time a reactor is off line and undergoing either refueling and/or repair is high. Anything that prolongs the off line time interval becomes an added cost through revenue loss to the utility. Since it goes without saying that access to the control rod drive from overhead requires removal of all overlying fuel bundles and associated reactor components, any procedures proposed for drive access from the top of the reactor must be simple and integrated to the control rod shuffling and refueling process.

Insofar as recognition of a problem constitutes invention, applicant claims invention in the disclosed solution to the problem stated immediately above.

SUMMARY OF THE INVENTION

A design is disclosed to realize the prior art suggestion for control rod drive removal from the top of a reactor rather than from beneath the reactor into required vertical interstitial interval between the bottom of the control rod drive housings and the bottom of the reactor containment building. The control rod drive is attached at its upper end to the bottom end of the control rod guide tube, a structure that contains the control rod when withdrawn from the core as well as structurally supporting the overlying fuel bundles in the reactor core. The control rod guide tube in turn couples at a rotationally locked bayonet fitting to the top of the control rod drive housing. Locking of the bayonet fitting occurs thru the orificed fuel support casting. The orificed fuel support casting, supporting the fuel bundles from the top of the control rod guide tube, is locked from rotation at a pin located on the reactor core plate. The control rod guide tube in turn locks rotationally to the orificed fuel support casting. During refueling, the fuel bundles and the orificed fuel support casting are removed, freeing the control rod guide tube and its depending drive for rotation. Thereafter a fitting captures the control rod guide tubes at coolant inflow apertures and rotates the guide tubes and the depending drives. Uncoupling of the control rod guide tube occurs at a bayonet fitting between the top of the control rod drive housing and the bottom of the control rod guide tube. Thereafter, upward removal of the control rod guide tube and, of necessity, the depending attached control rod drive occurs. Replacement of the drive occurs with the disclosed sequence reversed. A reactor assembly scenario is disclosed which obviates overall increase in the height of a reactor building to accommodate the required pull space under a reactor and accommodates itself to the reactor disassembly and assembly sequence during the fueling cycle.

OTHER OBJECTS, FEATURES AND ADVANTAGES

An object of this invention is to disclose a mechanical latching of the control rod drive to the control rod drive housing, this latching maintaining the control rod drive firmly in place during dynamic loadings and permitting convenient removal of the control rod drive from the top of the reactor during refueling. Accordingly, the control rod drive is dependingly attached to the bottom of a control rod guide tube—the structure that supports the overlying fuel bundles and contains the withdrawn control rod interior thereof when the rod is withdrawn from the core. A female bayonet fitting for the retention of the control rod drive within the control rod drive housing is provided at the the top of the control rod drive housing. A mating male bayonet member is provided at the top of the control rod drive. Rotation of the drive by rotation of the guide tube rotationally latches the control rod drive with the control rod drive housing. By the expedient of attaching the control rod drive to the bottom of the control rod guide tube, lowering and latching of the control rod drive remotely into place can conveniently occur.

Simply stated, the required steps for control rod drive removal include removal of the fuel bundles and orificed fuel support casting followed by uncoupling of the control rod. The disclosed drive removal can follow by the expedient of grasping and rotating and thereafter lifting the control rod guide tube.

An advantage of this aspect of the invention is that by manipulation of the guide tube corresponding manipulation of the drive can occur. Consequently, deep and independent penetration into the reactor core for control rod drive removal is not required.

A further aspect of this invention is that the removal of the control rod drive occurs with the same extent and frequency currently required for control rod guide tube removal. The control rod drive is thus removed with no additional steps during reactor refueling.

A further object to this invention is to disclose a rotational lock of the bayonet fitting maintaining the control rod drive against inadvertent rotation and undesired upward movement of the control rod drive, especially upon SCRAM. According to this aspect of the invention, the control rod drive is rotationally locked to its bayonet fitting at the top of the control rod drive housing. Since the control rod drive rotationally locks responsive to latching of the bayonet fitting, the control rod guide tube likewise rotationally registers responsive to latching of the bayonet fitting. The orificed fuel support casting is then placed on the top of the guide tube. This orificed fuel support casting also registers to a pin on the core plate. At the same time, the orifice support casting receives in a female aperture a pin protruding upwardly from the upper flange on the guide tube. Firm bracing of the latched bayonet occurs through the drive guide tube, orificed fuel support casting to the pin on the core plate.

An advantage of this aspect of the invention is that the order required for locking the component portions of the control rod drive into place naturally fits with the required assembly and disassembly sequence of the reactor components.

A further advantage of this invention is the simplification of the control rod drive itself. The control rod guide cap and its bayonet fitting can be omitted. Further, the so-called middle flange coupling of the lower part of the control rod drive to the gland seal and motor can likewise be omitted. Further, since the whole control rod assembly is suspended from the guide tube, the complexities of the pin and the guide cap and the slot in the pressure tube for the purpose of accommodating thermal expansion can likewise be omitted.

In short, the disclosed design and accompanying protocol vastly simplifies design detail, maintenance detail, and removal detail of the control rod drive. At the same time, the design change in this complex environment does not alter core support, core circulation or control rod insertion.

BRIEF DESCRIPTION OF THE DRAWINGS

Other objects, features and advantages of this invention will become more apparent after referring to the following specification and attached drawings in which:

FIG. 1A is a schematic of a boiling water reactor and its containment building illustrating the relationship between the bottom of the reactor vessel and the bottom of the containment building with the depending control rod drive housing, the control rod drive housing here having the required interval for removal and replacement of the control rod drive from below the control rod housings above the bottom of the containment building:

FIG. 1B is a drawing similar to FIG. 1A illustrating the reduced height of the containment building where the interval for the control rod drives is omitted and removal of the control rod drive from the top of the reactor is possible:

FIGS. 2A–2B are serial views of four side-by-side fuel bundles controlled by a single control rod with the support path of the fuel bundles passing through the orificed fuel support casting to the control rod guide tube with the drive and control rod illustrated immediately therebelow;

FIG. 3 is a perspective view of the orificed fuel support casting or "elephant's foot";

FIG. 4 is an exploded detail illustrating the flange at the top of the control rod guide tube stopped in rotation by a pin on the core plate with the overlying orificed fuel support casting being lowered to rotationally register to a pin on the core plate and receive an upwardly exposed pin from the guide tube flange to lock the assembly in place; and FIG. 5 is a perspective view of the bayonet fitting between the top of the control rod drive and the control rod drive housing.

Referring to FIGS. 1A and 1B (both of which represent the prior art), the utility of the disclosed invention can be demonstrated. Specifically, a reactor vessel V covered by a dome D has a core C contained therein. As will hereinafter be set forth, core C contains the fissionable materials.

Core C is supported from the bottom of the reactor vessel 14 on guide tubes G.

Depending from the bottom of vessel V are a plurality of housings H. As will hereinafter be set forth, these housings H each contain a control rod drive.

In the view of FIG. 1A, a containment building B is illustrated at the bottom of the reactor. An interval I between the bottom of the housings H and the containment building B is shown.

The control rod drives extend the length of housing H. In the prior art, these drives have been required to be lowered. Typically they are lowered free and clear of their individual housing H.

For this reason, the containment building B has been required to be incrementally of greater height. This increment of greater hight equals the required access interval for the drives from below the housing H.

If it is possible to withdraw the control rod drives from above the reactor core, the containment building B may be made of lesser height. Furthermore, the reactor vessel V does not have to be at the same elevated level, the reactor may be lowered. Accordingly, and referring to FIG. 1B, the suggestion of the prior art can be set forth.

Referring to FIG. 1B, a vessel V capped by a dome D has its core C and guide tubes G arranged all as before.

It will be seen that building B is of a lesser height. Specifically, the interval I (see FIG. 1A) is no longer required for the control rod drive removal. Instead, control rod drive removal occurs from the top of the reactor utilizing standard overhead lifting equipment (not shown) for servicing and repair of the reactor.

It is the purpose of this patent application to therefore set forth a protocol for the servicing and removal of the control rod drive from above the reactor, as has been suggested by the prior art.

Referring to FIGS. 2A and 2B, this advancement may now be set forth.

Referring to FIG. 2A, reactor vessel V is illustrated adjacent a single control rod drive housing H1. In discussing the disclosed housing, attention will first be directed to the load path. It will be shown that the upward portion of the housing H1 bears the vertical load which supports the fuel bundles 21–24 through the orificed fuel support casting 28 and the guide tube 30. Thereafter, the function of the control rod drive R will be summarized. Response first to the drive of motor M will be discussed. Thereafter, hydraulic response responsive to pressure at inlet Q will be set forth. Following the operational discussion of the control rod drive, the suspension of the drive R from the bottom of the guide tube 30 interior of the control rod drive housing H1 will be set forth. Finally locking of the control rod drive R in place will be discussed.

Once the discrete inner connection of the drive is discussed, the disassembly details will be set forth. It will be pointed out that removal of the drive can optionally include simultaneous removal of control rod.

Referring to FIG. 2A, housing H1 is shown attached to vessel V. Such attachment typically occurs at an aperture 32 in the bottom of the vessel V through a stub tube 33. (The stub tube accommodates differential thermal expansion between the vessel V and the housing H1.) A redundant shoot-out ring 34 provides backup in the event of failure of the weld between the housing H1 and the stub tube 33.

There is provided a control rod guide tube 30. Guide tube 30 is shown here foreshortened. It will be understood that the guide tube is at least as long as the control rod.

Guide tube 30 has three discrete functions. These functions are the support of the overlying portion of the reactor core, the channeling of coolant to the core and containment of the withdrawn control rod.

First, guide tube 30 bears at a lower flange 36 on the top of a flange 35 on the control rod drive housing. The guide tube is the primary support member supporting the overlying orificed fuel support casting 28 and the four fuel bundles 21–24.

Brief reference to the orificed fuel support casting can be made.

Referring to FIG. 3, the orificed fuel support casting 28 can be understood. The casting includes a central cruciformed shaped aperture 50. It is in this aperture 50 that the control rod 40 penetrates for control of the nuclear reaction.

Each of the fuel bundles 21 through 24 has a lower tie plate 51–54. These lower tie plates are received in apertures 56–59 at the top of the orificed fuel support casting 28.

The orificed fuel support casting forms a flange 60. Flange 60 rests on the upper portion 61 of the guide tube 30. It is through this flange 61 that guide tube 30 transmits the overlying weight of the fuel bundles 21, 24 to the flange 35 at the top of the control rod drive housing H1 (see FIG. 2A).

Having set forth the load path for the support of the reactor, the flow path of coolant for the control of the reaction and the generation of steam can now be set forth.

As is standard in boiling water reactors, a core plate 62 defines a plenum 64 which plenum is the inlet for coolant for upward flow interior of and exterior of the fuel bundles 21–24. The flow path passes through an orifice 66 in the upper portion of the guide tube 30 and a registered orifice 68 in the orificed fuel support casting 28. As can be seen, a wall 69 within the orificed fuel support casting 28 causes water to be metered to an inlet 70 in the respective lower tie plates 51–54 of the fuel bundles 21–24. Thus, in addition to the support of the fuel bundles 21–24, the guide tube 30 and the orificed fuel support casting 28 permit water inflow to the fuel bundles.

The guide tube additionally permits the control rod 40 to be contained interior thereof and guided in its up and down excursion into and out of the cruciformed shaped interstices between fuel bundles 21–24.

Finally, and in a fourth guide tube function that is novel with this disclosure, guide tube 30 is attached to control rod drive R. Specifically, pins 80 and 81 attach the pressure tube 84 of the control rod drive to a bottom annular member 37 on the control rod guide tube. This attachment permits the rotation and removal of guide tube 30 to be followed by corresponding rotation and removal of the drive R.

Having set forth the load path and overall function of the guide tube in supporting the fuel bundles, metering water to the fuel bundles, containing the control rod and finally attaching to the control rod drive R, attention will be devoted to a brief operational summary of the drive. Since the operating mechanics of the drive are substantially unaffected by this invention, this description will be made in a summary format.

Referring to both FIGS. 2A and 2B, the control rod drive includes a pressure tube 84. Pressure tube 84 serves two functions.

First, it contains a ball screw and following ball nut for the controlled insertion and withdrawal of the control rod 40.

Second, it contains a piston 85. Piston 85 responsive to hydraulic fluid Q introduced at aperture 86 causes detachment of the control rod from the top of the ball screw nut 87. Immediate hydraulic insertion of the control rod 40 occurs. A spring biased latch 88 engages the interior of the control rod drive and maintains control rod 40 in the inserted position until conventional lowering of the control rod occurs by motor M and ball screw nut 87.

Having set forth in summary format the operation of the control rod drive R, attention can now be directed to the suspension of the drive.

Typically, pin 80 causes pressure tube 84 to depend interiorly of control rod drive housing H1. The bottom of pressure tube 84 has a depending female spline 90. Female spline 90 fits over a male spline member 91 at the top of a sealing gland (or spool piece) 93. Spool piece 93 bolts onto the bottom of the control rod drive housing H1 at a flange 94 on the housing and a flange 95 at the top of the spool piece.

It should be noted that spool piece 93 is largely conventional. This spool piece is modified from the prior art in that it includes an inlet aperture 96 and a ball check valve 97 for actuation of the hydraulic SCRAM. It will further be understood that when the control rod 40 is in the lowered position, spool piece 93 and motor M can be changed at the bottom of the control rod drive housing H1.

Spool piece H defines the shaft connection between the motor shaft 100, a spool piece shaft 102, and the driven male coupling 91 and following female coupling 90. Rotation of the motor M at shaft 100 thus causes screw 104 to move ball screw nut 87 upwardly and downwardly dependent upon the direction of rotation of shaft 100. As is conventional, a synchromechanism 101 attaches to the bottom of the motor for control information relative to the vertical position of the following ball screw nut 87 and the position of penetration of control rod 40 within the fuel bundles 21-24.

Having set forth the suspension of the control rod drive, attention will be devoted to the locking of the control rod drive in place Such locking can be illustrated with respect to FIGS. 2A illustrating the upper drive detail, FIG. 3 illustrating the orificed fuel support casting and FIG. 4 illustrating the locking detail.

Referring to FIG. 4, an ear 110 protruding from the upper portion of guide tube 30 is illustrated. Ear 110 moves from a rotational position 110 to a stop against pin 115 on core plate 62.

Guide tube 30 is originally lowered and placed to the top of the control rod drive housing H1 with ear 110 in the position shown in broken lines at 110. At this juncture, a male bayonet member 120 protruding through apertures 122 in pressure tube 84 is received within a female bayonet aperture 126 at the top of the housing H1.

Referring to the detail of FIG. 5, it can be seen that male bayonet fitting 120 is loaded upwardly by Belleville springs 130.

Once the control rod drive R is placed internally of the housing H1, rotation of guide tube 30 occurs. Rotation is clockwise until the tab 110 rotates into registry with pin 115 on core plate 62. At that point, ear 110 stops further rotation because of its abutment to pin 115. This relative rotation occurs at the top of the guide tube 30.

At the same time adjacent the bottom of the guide tube 30 and at the top of the control rod drive R, male bayonet member 120 has rotated interiorly of female bayonet aperture 126. Rotation has occurred from the vertical access slot 127 to a downwardly sloped trapping slot 128. Belleville springs 130 are loaded by male bayonets member 120. The drive R is firmly held interior of the housing.

The reader will understand that the drive R is typically held rigidly to the bottom of the control rod 40. Upon rapid insertion of the control rod 40, as during SCRAM of the reactor, there would be a tendency of the control rod drive R to release upwardly under the inertial force of the sudden stoppage of the rapidly inserted control rod 40. The bayonet fitting including male bayonet member 120 fitting in female bayonet groove 126 prevents such upward movement.

Once guide tube 110 has registered at pin 115, it is necessary to prevent counterclockwise rotation of the top of the guide tube with correspondent release of the drive at the lower bayonet fitting. This is accomplished through the orificed fuel support casting 28 as can be further seen from the detail of FIG. 4.

Referring further to FIG. 4, it can be seen that orificed fuel support casting 28 includes two additional features, these additional features not being shown in the prior art. First, the casting 28 includes paired side-by-side outwardly protruding ears 140, 141. These ears define a pin receiving aperture 142 therebetween. When the orificed fuel support casting 28 is lowered onto the top of the guide tube, groove 142 receives a pin 115 from core plate 62. Thus, the orificed fuel support casting is locked from rotation.

Second, guide tube 30 includes a pin 156. Pin 156 is received interior of a pin aperture 158 at the bottom of the orificed fuel support casting 28. Thus, the rotational locking of the control rod drive R in place is clear. Pin 115 from core plate 62 locks ears 140, 141 about pin 115 preventing rotational movement of the orificed fuel support casting 28. At the same time, the orificed fuel support casting 28 at a pin 156 received interiorly of an aperture 158 rotationally lock guide tube 30 in place. The guide tube being locked in place, male bayonet member 120 is locked interior of the female bayonet groove 126. Firm fastening of the control rod drive R results.

Having set forth the construction, the disassembly sequence can be summarized.

In disassembly, fuel bundles 21-24 are first removed. Thereafter, fuel support casting 28 is likewise upwardly removed.

Thereafter, control rod guide tube is grasped at apertures 66 by well known prior art lifting mechanism. The lifting mechanism rotates control rod guide tube 30. Upon rotation, male bayonet member 120 moves from a locking position to a release position interior of the female bayonet groove 126. When the guide tube is rotated 45@, the guide tube is lifted upwardly.

It is important to note that it is optional that the control rod 40 be removed before upward lifting of the guide tube. If the control rod is left in place, the manipulation of the guide tube will include simultaneous lifting of the control rod as well. Alternately, the control rod may be separately removed as is well understood in the prior art.

The reader will understand that the mechanical detail herein explained is relatively complex. However, it must be appreciated that the disclosed method of supporting the control rod drive R from the bottom of the guide tube 30 constitutes a simplification over the prior art. Serendipitously, a simplification in the attached drive mechanism occurs in numerous aspects.

What is claimed is:

1. In a nuclear reactor having a reactor vessel, a core for the containment of fissionable materials with discrete fuel bundles comprising said core, an orificed fuel support casting for supporting four of said fuel bundles and channeling coolant to said fuel assemblies for a controlled nuclear reaction and the generation of steam, a core plate for providing an aperture for said fuel support casting between a lower coolant inlet plenum on one side and said fuel bundles on the upper side. a control rod for the insertion to and from a position between said fuel bundles wherein the nuclear reaction of said fissionable materials within said fuel bundles can be controlled, a control rod guide tube for supporting said orificed fuel support casting and fuel bundles and for receiving said control rods upon withdrawal from a position between said fuel bundles. and a control rod drive housing depending downwardly below said reactor vessel for receiving a control rod drive, the improvement to said control rod drive, control rod drive housing and control rod guide tube comprising:
   said control rod drive dependingly attached to the bottom of said control rod guide tube;
   a coupling interconnecting the top of said control rod drive to the top of sid control rod drive housing whereby said control rod drive is removable with and integrally dependent from the bottom of said control rod guide tube.

2. The invention of claim 1 and including a male bayonet fitting protruding from the top of said control rod drive;
   means at the top of said control rod drive housing for defining a female bayonet fitting whereby rotation of said guide tube with rotation of said attached control rod drive moves said male bayonet fitting to and from a position of engagement with said female bayonet fitting.

3. The invention of claim 2 and including improvement to said orificed fuel support casting, said improvement comprising means for rotationally locking the control rod guide tube including a pin on the core plate of said reactor:
   tabs configured to the orificed fuel support casting of registering to said pin and maintaining said orificed fuel support casting in rotational alignment with respect to said core plate;
   an upwardly extending pin from the top of said guide tube;
   an upwardly defined aperture defined at the bottom of said orificed fuel support casting, said upwardly defined aperture at the bottom of said orifice support casting defined for reception of the pin from said guide tube whereby said guide tube is locked through said orifice support casting rotationally with respect to the pin on said core plate and said male and female bayonet fittings are locked in engagement.

4. In a nuclear reactor, a control rod drive suspension comprising in combination:
   a reactor vessel;
   a core for the containment of fissionable nuclear materials within said reactor vessel, said core including at least four square sectioned side by side discrete fuel bundles;
   an orificed fuel support casting having four discrete apertures at the upper end, said four discrete apertures each forming a point of support of a discrete fuel bundle;
   said orificed fuel support casting defining a hollow chamber for receiving and channeling coolant to said fuel bundles for controlled nuclear reaction and the generation of steam;
   a core plate for providing an aperture between a lower coolant inlet plenum and said fuel bundles;
   a control rod guide tube for supporting said orificed fuel support casting, said control rod guide tube extending to the bottom of said reactor vessel through said coolant inlet plenum;
   said control rod guide tube defining apertures for permitting fluid inflow from said plenum into said orificed fuel support casting for channeling coolant to said fuel bundles;
   a control rod drive for moving a control rod to and from containment in said control rod guide tube from and to a position of penetration between said fuel bundles;
   means for dependingly attaching said control rod drive to said control rod guide tube;
   a control rod drive housing depending downwardly below said reactor vessel for receiving a control rod drive, said control rod drive housing having an upper end supported from the reactor vessel, said control rod drive housing supporting said guide tube, said orificed fuel support casting and said fuel bundles;
   a control rod drive, said control rod drive attached to and depending from the top of said control rod drive housing;
   a first coupling member defined adjacent the top of said control rod drive housing;
   a second coupling member protruding from said control rod drive, said coupling members cooperatively formed for insertion and rotational locking whereby lowering of said guide tube affects insertion of said coupling at the top of said control rod drive and rotation of said guide tube affects locking of said coupling member.

5. The invention of claim 4 and wherein said coupling member at said control rod drive includes means for biasing said coupling member upwardly to engage said coupling member on said control rod drive housing.

6. The invention of claim 4 and wherein said control rod drive includes a male coupling member and said control rod drive housing includes a female coupling member.

* * * * *